United States Patent [19]
Rockaitis, III

[11] Patent Number: 5,249,549
[45] Date of Patent: Oct. 5, 1993

[54] DISPOSABLE PET LITTER CONTAINER

[76] Inventor: Joseph J. Rockaitis, III, 3213 N. Queen Anne Rd., Woodstock, Ill. 60098

[21] Appl. No.: 816,212

[22] Filed: Jan. 3, 1992

[51] Int. Cl.$^5$ .............................................. A01K 29/00
[52] U.S. Cl. ..................... 119/165; 119/168; 206/508; 206/510; 229/125.36
[58] Field of Search ............... 119/165, 166, 168, 169; 206/204, 501, 502, 509, 510, 511, 508; 229/125.03, 125.36

[56] References Cited

U.S. PATENT DOCUMENTS

| | | | |
|---|---|---|---|
| 1,717,974 | 6/1929 | Heinrichs | 206/502 |
| 2,401,038 | 5/1946 | Barton et al. | 229/125.03 |
| 3,745,975 | 7/1973 | Prucha . | |
| 4,171,680 | 10/1979 | Silver et al. . | |
| 4,444,148 | 4/1984 | Lander . | |
| 4,627,381 | 12/1986 | Reed et al. . | |
| 4,627,382 | 12/1986 | Muzzey . | |
| 4,648,349 | 3/1987 | Larson | 119/168 |
| 4,716,853 | 1/1988 | d'Aniello . | |
| 4,779,567 | 10/1988 | Smith . | |
| 4,782,976 | 11/1988 | Kenyon | 206/508 |
| 4,846,103 | 7/1989 | Brown | 119/168 |
| 4,858,559 | 8/1989 | Allen . | |
| 4,869,204 | 9/1989 | Yananton | 119/169 |
| 4,884,526 | 12/1989 | Giannakopoulos . | |
| 5,035,205 | 7/1991 | Schiller et al. . | |

FOREIGN PATENT DOCUMENTS 3420837 12/1985 Fed. Rep. of Germany ...... 119/165

*Primary Examiner*—John J. Wilson
*Assistant Examiner*—Todd E. Manahan
*Attorney, Agent, or Firm*—Kinzer, Plyer, Dorn, McEachran & Jambor

[57] ABSTRACT

A disposable litter container for pets, usually cats, includes a molded tray of water-absorbent paper material that does not lose appreciable structural strength upon absorption of limited quantities of water. The paper material preferably includes an appreciable wax content. The tray has a bottom wall formed integrally with side walls, enclosing a litter chamber, with the side walls extending upwardly from the bottom wall for a predetermined height greater than the litter chamber height. Lid retainers are molded into the side walls at the top of the chamber. A lid interfits with the lid retainers to seal the top of the litter chamber. There are complementary, interfitting supports on the lid and on the tray that adapt the lid to service as a base for the tray when the lid is removed. The lid can be replaced, when the litter is spent, to re-seal the container for disposal.

18 Claims, 2 Drawing Sheets

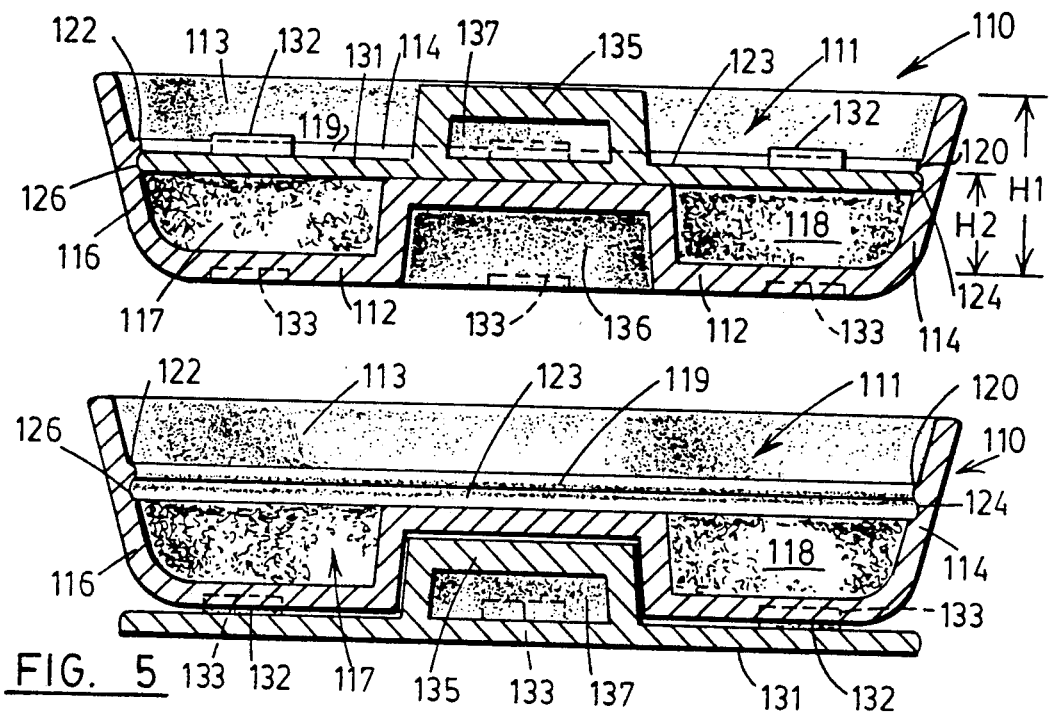
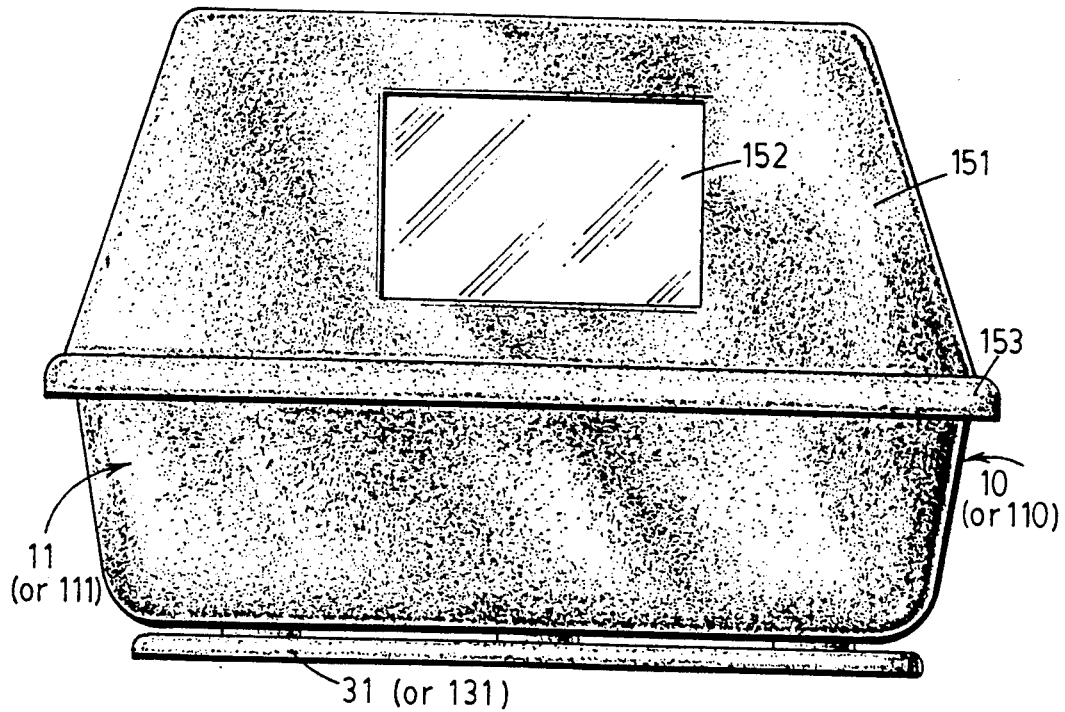

DISPOSABLE PET LITTER CONTAINER

BACKGROUND OF THE INVENTION

Many pets, mostly cats, can be trained to utilize a tray or other container filled with absorbent and frequently order-minimizing material for the disposition of their bodily wastes, both liquid and solid. The traditional arrangement utilizes a permanent tray, usually metal or plastic, that is impervious to water. The tray is filled with an appropriate, usually granular material that absorbs liquid and that may include odor reducing components. This material is most frequently referred to as "litter" and is commonly sold in relatively large sacks or other containers capable of filling the tray several times. In some instances the tray is lined with plastic film to be used to dispose of the litter when a change is required.

These traditional arrangements present some continuing problems and difficulties for the person responsible for care of the pet. Thus, regardless of the materials used in the litter, odor is frequently a substantial problem. Disposition of the used litter, when a change is necessary, is a disagreeable task. The pet, particularly a cat, may tear the plastic liner in the course of its activities preliminary to use of the litter tray, in which case some of the waste, particularly liquid waste, may collect in the tray itself and may require washing or other such action. For most litter, refilling the tray presents a substantial dust problem.

These problems and difficulties with the traditional pet litter container arrangements have led to development of a variety of temporary trays and other containers for use with pet litter. These temporary pet litter containers are usually partially disposable or include some disposition provisions such as a separate plastic film sack. These developments tend to minimize or even eliminate some of the problems associated with disposition of used litter. They do not particularly improve odor problems and frequently provide no assistance in connection with residual liquid waste collecting in the tray at the bottom of the litter. Those that have liners of plastic film or the like present the same problem as with a liner used in a permanent tray.

SUMMARY OF THE INVENTION

It is a principal object of the present invention, therefore, to provide a new and improved disposable pet litter container that effectively minimizes or eliminates the principal problems previously encountered with pet litter arrangements, whether employing permanent trays or temporary, disposable trays.

A more specific object of the invention is to provide a new and improved disposable pet litter container formed of a water-absorbent paper material that does not lose appreciable structural strength upon absorption of limited quantities of liquid waste or other water, a container that materially reduces odor problems because it does absorb liquid waste.

A further specific object of the invention is to provide a new and improved disposable pet litter container that comes to the pet owner filled with its own litter, that has a lid which serves as a base for the litter container while it is set up for use by the pet, and that can be resealed with the same lid for convenient disposition after the useful capacity of the litter has been surpassed.

Another object of the invention is to provide a new and improved disposable pet litter container that is simple and inexpensive to manufacture, and that is formed of biodegradable materials.

Accordingly, the invention relates to a disposable pet litter container comprising a tray of molded, water-absorbent paper material that does not lose appreciable structural strength upon absorption of limited quantities of water that paper material constituting paper pulp containing at least five percent (5%) of a non-water-absorbent additive; the tray has a bottom wall of given size and configuration formed integrally with side wall means enclosing the bottom and sides of a litter chamber, the side wall means including at least one sidewall extending upwardly for a predetermined height H1 around the outer edge of the bottom wall, and lid retainer means, molded into the side wall means at a given height H2 above the bottom wall of the tray, with H1>H2, thus defining the upper limit of the litter chamber. The litter container further comprises a reusable lid having a size and configuration corresponding to the size and configuration of the bottom wall of the tray, which lid interfits with the lid retainer means to seal the top of the litter chamber; there are complementary, interfitting support means on the lid and the tray adapting the lid to service as a base for the tray by removal of the lid from the lid retaining means and placement of the tray on the lid.

BRIEF DESCRIPTION OF THE DRAWINGS

FIG. 4 is a sectional view, similar to FIG. 2, of another embodiment of the invention;

FIG. 5 is a sectional view of the disposable pet litter container of FIG. 4 set up for use by the pet; and FIG. 6 illustrates another form of the disposable pet litter container provided with a supplemental cover.

DESCRIPTION OF THE PREFERRED EMBODIMENTS

Figure 1:
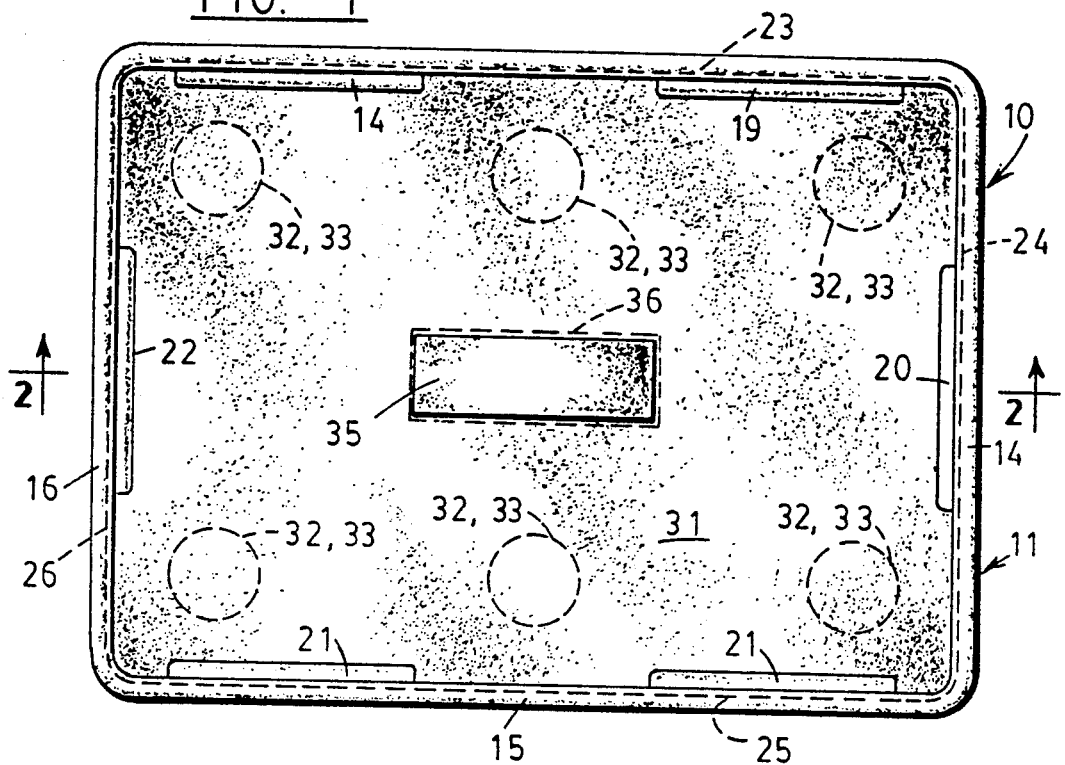
FIG. 1 is a plan view of a disposable pet litter container constructed in accordance with one embodiment of the invention.
Figure 2:
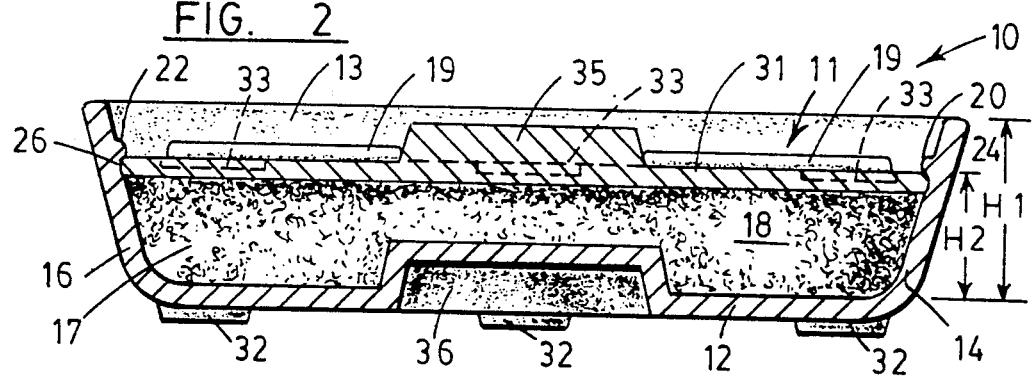
FIG. 2 is a sectional view taken approximately as indicated by line 2—2 in FIG. 1 showing the pet litter container as it would be supplied to the pet owner.
Figure 3:
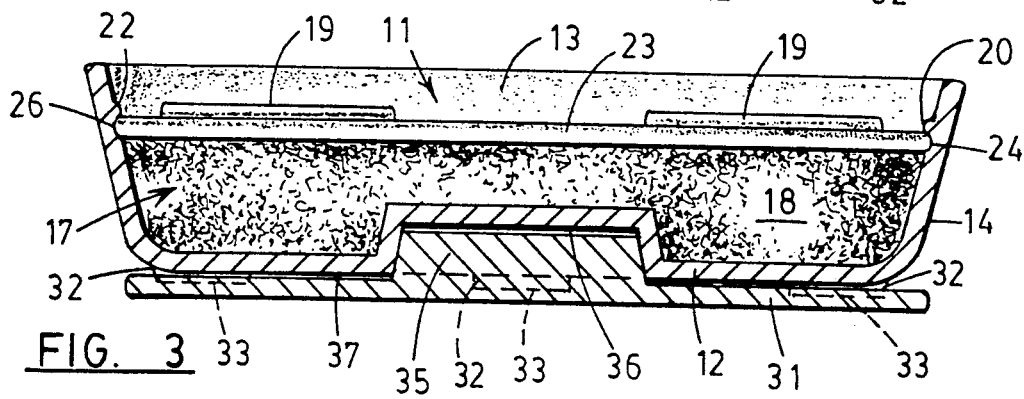
FIG. 3 illustrates the disposable pet litter container of FIGS. 1 and 2 set up for use by the pet, in a sectional view like FIG. 2.

FIGS. 1–3 illustrate a disposable pet litter container 10 comprising one of the preferred embodiments of the present invention. The pet litter container 10 includes a tray 11 formed of molded, water-absorbent paper material that does not lose appreciable structural strength upon absorption of limited quantities of urine or of water in other forms. Tray 11 has a bottom wall 12 of given size and configuration; for example, the bottom wall might be of rectangular configuration with dimensions of about 15 inches by 18 inches. Tray 11 further comprises side walls enclosing the sides of a litter chamber 17. In tray 11, there are four side walls 13, 14, 15 and 16 enclosing the sides of litter chamber 17. Each of these side walls extends upwardly for a predetermined height H1 above the upper surface of bottom wall 12 and at the outer edge of the bottom wall. Typically, H1 may be about five to eight inches.

Tray 11 of the disposable pet litter container 10, FIGS. 1–3, incorporates lid retainer means, molded into the side walls 13–16, at a given height H2 above the bottom wall 12 of the tray. H2 is appreciably smaller than H1. This lid retainer means includes a plurality of ridges 19, 20, 21 and 22 that are formed integrally with and project inwardly from the side walls 13, 14, 15 and 16, respectively. The lid retainer means further comprises four elongated receptacles or grooves 23, 24, 25 and 26 that are molded into side walls 13, 14, 15 and 16, respectively, each groove being located immediately below the retainer ridge in its associated side wall. As will be apparent from FIGS. 1-3, grooves 23-26 are actually continuous around the side wall periphery of tray 11. The lid retainer means 19-26 defines the upper limits of the litter chamber 17, shown in FIGS. 2 and 3 as filled with an appropriate litter material 18.

The disposable pet litter container 10, FIGS. 1-3, further comprises a reusable lid 31 having a size and configuration corresponding approximately to the size and configuration of the bottom wall 12 of tray 11. The correspondence is not quite precise, because the side walls 13-16 of tray 11 preferably are inclined outwardly to some extent. However, this correspondence is quite close and the only difference is that required by the draft or outward inclination of the side walls of the tray. Lid 31 interfits with the lid retainer means to seal the top of the litter chamber 17 so that all of the litter 18 is effectively retained in the chamber. This is accomplished by having the perimeter of lid 31 fit into the grooves 23-26 in the side walls of tray 11.

The disposable pet litter container 10 further comprises complimentary interfitting support means on the lid 31 and tray 11 that adapt the lid to serve as a lid for the tray during use, in the manner shown in FIG. 3. That is, when container 10 is to be put into use for pet waste disposal, lid 31 is removed from the position in the tray shown in FIG. 2. This is accomplished by grasping a handle 35 to pull upwardly on the lid. Lid 31 has enough flexibility so that it can be lifted out of the retaining means 19-26. The top surface of lid 31 has a plurality of shallow sockets or receptacles 33 at six different locations as best shown in FIG. 1. Each of these sockets 33 corresponds in position, on lid 31, to a short projection or foot 32 that extends outwardly from the bottom wall 12 of tray 11. Thus, when lid 31 is removed from the assembled container, lifted out of the position shown in FIG. 2, and placed upon a support surface such as a floor, tray 11 is readily disposed on the lid so that the lid serves as a base for the tray. This is made possible by a socket or retainer depression 36 in the bottom wall 12 of the tray, into which the lid handle 35 fits (FIG. 3). In the preferred construction there is a thin air space 37 between the bottom tray wall 12 and the top of lid 31 when the litter container 10 is in use as shown in FIG. 3.

Use of the disposable pet litter container 10 by the pet, with the container components associated as shown in FIG. 3, is the same as for prior pet litter containers, temporary or permanent, as far as the pet is concerned. Thus, the pet deposits liquid or solid waste in the litter 18 in the usual manner; most cats will cover the litter deposit when they have finished. Much of the liquid waste is absorbed by litter 18, as in previously known arrangements. Any liquid that reaches the walls of tray 11 is absorbed. In the unlikely event that any of the urine exceeds the absorption capacity of the bottom wall 12 of tray 11, it is promptly absorbed by lid 31, which is molded of the same water-absorbent paper material as tray 11.

When the person responsible for the pet concludes that the litter 18 is pretty well exhausted, a conclusion that depends upon the physical condition and size of the pet, disposal of pet container 10 is required. This is accomplished readily by lifting tray 11 off of the base afforded by lid 31 and by replacing lid 31 in the position shown in FIGS. 1 and 2. This effectively seals the litter in chamber 17 and permits disposal of the container, and the used litter, in a conventional manner. Thus, disposition may be made through municipal garbage pickup or virtually any other desired channel. The components of the container 10, tray 11 and lid 31, are both biodegradable so that the container can be disposed of via land fill operations. There may be some minor increase in volume of litter 18 during use. Ordinarily, this will be compensated by some settling of the litter and/or by some shrinkage due to the absorption of liquid wastes. To be absolutely certain that the lid 31 can be replaced to seal off litter chamber 17 totally after use, the original level of litter 18 in chamber 17 can be kept just slightly under the bottom of lid 31.

The material used in forming tray 11 and lid 31 should be different from ordinary paper pulp materials such as those used, for example, in molding egg cartons or in papier-mache molding pulps. Thus, as previously noted, the material employed in molding tray 11 and lid 31 should be a paper material that does not lose appreciable structural strength upon absorption of limited quantities of water. This is not characteristic of most egg carton materials or most papier-mache formulations. To achieve the desired characteristics for the paper pulp, that pulp should contain at least 5% of a wax, a resin, or other such material that is not water absorbent and that will aid the molded tray 11 and lid 31 in retaining structural strength despite absorption of liquid waste (urine).

One type of material that has been found to provide the desired qualities of water absorbency with retention of structural strength is a molded pulp material formed of a mixture of ground wax paper liquid containers., such as milk cartons, cups, and the like, with a substantial proportion of kraft paper pulp. A mixture of 25% kraft paper pulp and 75% pulped material formed from wax paper liquid containers has been found to give good results. These proportions can be adjusted to some extent. Preferably, the kraft pulp content is kept to less than 50% and the ground material formed from wax paper liquid containers is no more than 85%. The resultant material looks much like the papier-mache type material used for egg cartons but is actually substantially stronger when wet, as the interior of a litter box inevitably is on occasion. H may be quite inexpensive. Of course, the thickness of the walls of tray 11, particularly bottom wall 12, can also be important. A bottom wall thickness of at least 0.25 inch is desirable.

FIGS. 4 and 5 afford views, like FIGS. 2 and 3, of a disposable pet litter container 110 constituting another embodiment of the present invention. The disposable pet litter container 110 includes a tray 111 molded from a water-absorbent paper material that does not lose appreciable structural strength when it absorbs limited quantities of urine or water. The bottom wall 112 of tray 111 has a given size and configuration and is of integral construction with side wall means, shown as including side walls 113, 114, and 116. These walls, and an additional wall that has been cut away in the sectional views of FIGS. 4 and 5, together with bottom wall 112, enclose a litter chamber 117 having a height H2 that is substantially less than the overall height H1 of the side walls. That chamber is filled with an appropriate litter material 118. A lid retainer means comprising a series of retainer ridges 119, 120 and 122 and a corresponding series of retainer grooves 123, 124, and 126 in the side walls that appear in FIGS. 4 and 5 are molded into the side walls of tray 111. They define the upper limit, at height H2, of the litter chamber 117.

The disposable pet litter container 110 includes a reusable lid 131 having a size and configuration corresponding approximately to the size and configuration of the bottom wall 112 of the tray. As before, the only difference is that required to match with the draft or outward angular disposition of the side walls of the tray so that the rim of the reusable lid can fit into the grooves 123-126 below the ridges 119-122. Thus, lid 131 seals off the top of the litter chamber 117. As in the previous embodiment, the reusable lid 131 includes a central handle 135 that is adapted to fit into a recess or socket 136 in the bottom of the tray as shown in FIG. 5. In this embodiment handle 135 has a central opening 137 to enable the user of container 110 to pull the lid out of the container more conveniently.

As in the previous embodiment, device 110 (FIGS. 4 and 5) includes a plurality of mounting feet 132 used to support tray 111 on lid 131 when litter 118 is in use, as shown in FIG. 5. In this instance, however, the feet 132 are molded integrally with the top surface of lid 131. These feet 132 each fit into a socket or recess 133; the recesses 133 in this embodiment are found in the bottom wall 112 of tray 111. The use of disposable pet litter container 111 and its advantages are the same as for the container 10 of FIGS. 1-3 and hence need no repetition.

FIG. 6 illustrates a modification applicable to the disposable pet litter containers 10 and 110 described above. As shown in FIG. 6, either disposable pet litter container may be provided with a cover 151. The cover 151 may be molded from the same paper pulp material as used for tray 11 or 111 and for lid 31 or 131. A transparent window 152 may be provided in the cover to permit examination of the litter without removal. The lower rim of cover 151 may afford a skirt 153 that fits the cover over the upper edge of tray 11.

In all embodiments, the absorptive characteristics of the molded material used for the tray and lid aid in reducing odor from the litter container. In the event that there is any leakage of urine through the bottom of the container, a rather unlikely circumstance, it is absorbed by the lid, which itself is formed of the same molded absorptive material. In any embodiment, the tray functions like a blotter, absorbing urine deposited in the tray within minutes without weakening the tray structurally. There are no folds or creases into or through which urine could possibly leak because the tray is a single molded unit. If there is any leakage, it is almost certain to be absorbed by the lid that serves as the base of the tray when the tray is in use. For all embodiments, it will be recognized that disposal is convenient and effective because the tray and lid material is biodegradable and the litter is sealed in the container for disposition.

What is claimed is:

1. A disposable pet litter container comprising:
    a tray molded of a water-absorbent paper material that does not lose appreciable structural strength upon absorption of limited quantities of water, that paper material constituting a paper pulp containing at least five percent (5%) of a non-water-absorbent additive;
    the tray having a bottom wall of given size and configuration formed integrally with side wall means enclosing the bottom and sides of a litter chamber, the side wall means including at least one sidewall extending upwardly for a predetermined height H1 around the outer edge of the bottom wall;
    lid retainer means, molded into the side wall means at a given height H2 above the bottom wall of the tray, with H1>H2, defining the upper limit of the litter chamber;
    a reusable lid having a size and configuration corresponding to the size and configuration of the bottom wall of the tray, which lid interfits with the lid retainer means to seal the top of the litter chamber;
    and complementary, interfitting support means on the lid and the tray adapting the lid to service as a base for the tray by removal of the lid from the lid retaining means and placement of the tray on the lid.

2. A disposable pet litter container according to claim 1 in which the lid is molded of a water-absorbent paper material that does not lose appreciable structural strength upon absorption of limited quantities of water, the lid material constituting a paper pulp containing at least five percent (5%) of a non-water-absorbent additive.

3. A disposable pet litter container according to claim 2 in which the support means includes a plurality of support feet and a corresponding plurality of support feet sockets for receiving the support feet, all molded integrally with the lid and the bottom of the tray.

4. A disposable pet litter container according to claim 3 in which the support feet are molded integrally with the bottom wall of the tray and project downwardly therefrom, and the support feet sockets are molded into one surface of the lid.

5. A disposable pet litter container according to claim 3 in which the support feet sockets are molded into the outer surface of the bottom wall of the tray, and the support feet are molded integrally with and project from one surface of the lid.

6. A disposable pet litter container according to claim 2 and further comprising:
    handle means, of predetermined size and configuration, molded integrally with the lid, for removal of the lid from the tray;
    and handle retainer means, molded integrally with the bottom wall of the tray and having a size and configuration complementary to the handle means, interfitting with the handle means when the lid serves as a base for the tray.

7. A disposable pet litter container according to claim 6 in which the handle means comprises a handle projecting from one surface of the lid and the handle retainer means comprises a handle socket in the bottom surface of the tray.

8. A disposable pet litter container according to claim 7 in which the support means includes a plurality of support feet and a corresponding plurality of support feet sockets for receiving the support feet, all molded integrally with the lid and the bottom of the tray.

9. A disposable pet litter container according to claim 1 in which the lid retainer means includes at least one groove, in the inner surface of the side wall means, for receiving the rim of the lid.

10. A disposable pet litter container according to claim 1 in which the lid retainer means includes at least one ridge projecting inwardly from the inner surface of the side wall means at height H2 to prevent upward movement of the lid.

11. A disposable pet litter container according to claim 10 in which the lid retainer means further includes at least one groove in the inner surface of the side wall means immediately below the at least one ridge, for receiving the rim of the lid.

12. A disposable pet litter container according to claim 1 in which:
   the tray is rectangular, with four side walls;
   the lid retainer means includes at least two ridges projecting inwardly from the inner surfaces of two opposed side walls at height H2, to prevent upward movement of the lid;
   and the lid retainer means further includes at least two grooves, one in the inner surface of each of the two opposed side walls immediately below the ridge on that side wall, for receiving the rim of the lid.

13. A disposable pet litter container according to claim 12 in which the lid is molded of a water-absorbent paper material that does not lose appreciable structural strength upon absorption of limited quantities of water, the lid material constituting a paper pulp containing at least five percent (5%) of a non-water-absorbent additive.

14. A disposable pet litter container according to claim 13 in which the support means includes a plurality of support feet and a corresponding plurality of support feet sockets for receiving the support feet, all molded integrally with the lid and the bottom of the tray.

15. A disposable pet litter container according to claim 13 and further comprising:
   handle means, of predetermined size and configuration, molded integrally with the lid, for removal of the lid from the tray;
   and handle retainer means, molded integrally with the bottom wall of the tray and having a size and configuration complementary to the handle means, interfitting with the handle means when the lid serves as a base for the tray.

16. A disposable pet litter container according to claim 15 in which the handle means comprises a handle projecting from one surface of the lid and the handle retainer means comprises a handle socket in the bottom surface of the tray.

17. A disposable pet litter container according to claim 1 in which the water absorbent paper material is molded from a pulp containing:
   up to 50% kraft paper pulp; and
   up to 85% pulp containing a non-water-absorbent additive.

18. A disposable pet litter container according to claim 1 in which the water absorbent paper material is molded from a pulp containing:
   about 25% kraft paper pulp; and
   about 75% ground wax paper liquid containers.

* * * * *